Nov. 11, 1969  L. A. TURNER  3,477,579
SELF-CLEARING SCREENING APPARATUS FOR USE IN
IRRIGATION AND LIKE PROJECTS
Filed Oct. 16, 1967  2 Sheets-Sheet 1

LAWRENCE ALEXANDER TURNER.
INVENTOR
By Wadsworth, Lind & Ponack.
Atty's

LAWRENCE ALEXANDER TURNER,
INVENTOR

United States Patent Office 3,477,579
Patented Nov. 11, 1969

3,477,579
SELF-CLEARING SCREENING APPARATUS FOR USE IN IRRIGATION AND LIKE PROJECTS
Lawrence Alexander Turner, Middleton, Cape Province, Republic of South Africa, assignor to Fluid Dynamics (Proprietary) Limited, Middleton, Republic of South Africa
Filed Oct. 16, 1967, Ser. No. 675,441
Claims priority, application Republic of South Africa, Oct. 20, 1966, 66/6,366
Int. Cl. B01d 35/22, 35/16
U.S. Cl. 210—156
8 Claims

ABSTRACT OF THE DISCLOSURE

The invention consisting of self-clearing screening means is intended for use in irrigation projects in which water is required to be led off from an impounded body of water in a weir, dam, or the like into a diversion canal. The apparatus of the invention is designed to prevent as far as possible the passage of floating debris into such diversion canal and is in the form of a screen arranged to be self-clearing.

---

According to the invention, a self-clearing screening apparatus comprises a spillway leading water impounded by a weir to the downstream side of it, a trough-like float chamber provided in the bottom of the spillway and having at least one clean water take-off passage communicating with it, a pivotally mounted undershot hollow variable buoyancy gate valve located in the float chamber and forming a partial closure for its top open side and with a pivotally mounted end of it facing upstream so that its opposite downstream facing free end is arranged to form obturating means for the said clean water take-off passage; a screening element forming at least part of the top side of the gate valve, and means connected to the gate valve adapted to admit and remove water from it for controlling its buoyancy and thereby controlling the opening and closing of the clean water take-off passage.

The means controlling the buoyancy of the gate valve by admitting and removing water to and from its buoyancy chamber of the gate valve may be of a syphon-operated kind.

When the gate valve is opened, its top side, including the screen covered part of it, will assume an upstream inclined disposition and floating debris will tend to pile up and eventually wholly or partially block the screen. This condition will cause a force to be exerted on the gate valve tending to cause it to sink, and the buoyancy of the gate valve may be so arranged that it will then momentarily close sufficiently to permit the flow of water down the spillway to wash the debris off the screen, thus lightening the gate valve and permitting its return to the fully open position.

Alternatively, the buoyancy chamber of the gate valve may be provided with a water inlet in a predetermined position so that when the floating level of the gate valve is lowered to a certain extent by the pressure caused by piled-up debris on it, water will enter such inlet and flood it, thereby causing it to close completely and thus allow the debris to be washed off the screen and its top side. The control apparatus will then be used to empty the buoyancy chamber so as to permit the gate valve to return to its fully open position. The control apparatus may be arranged to come into operation on the elapse of a fixed period of time after the gate valve has closed in the manner above described.

The gate valve is preferably of the sector type and is so arranged in the float chamber that the lower side of its free end is constructed to form the obturating means for the clean water take-off passage, which is arranged to communicate with the float chamber at or close to its bottom side, so that silt can be readily discharged through such clean water take-off passage, which may be a pipe.

The area of the top side of the gate valve covered by the screen, is preferably an area adjacent to the upstream facing pivotally mounted end thereof and is supported by arms or a framework forming part of the gate valve.

According to a modification, means are provided to close off the screen when the gate valve is in its "down" or fully closed position so that the tendency for silt to build up in the float chamber is prevented or at least substantially lessened. This closing action may be effected by providing a fixed closure surface or plate beneath the screen so that when the gate valve is in its "down" position, such closure surface or plate closes off the screen opening in the top side of the gate valve.

The apparatus of the invention may be modified so that it will in addition function as silt trapping and scouring means to prevent silting up of the gate valve in the float chamber.

To achieve this, the upstream side of the float chamber is extended in an upstream direction beyond the pivot axis of the gate valve, to provide a silt collecting chamber, and the top open side of this extension is covered by means of a fixed screen. The bottom downstream side of the silt collecting chamber is formed by a silt arresting plate pivotally attached to the upstream side of the silt collecting chamber along a line downwardly from its top end and having float means attached to its free end so that normally it will assume an inclined position with its free end raised, so as to form, with the upstream and side walls of the extension of the float chamber, a hopper-like depression for silt collecting purposes. When a sufficient quantity of silt has been deposited against the silt arresting plate to overcome the buoyant effect of the float attached to the free end of the silt-arresting plate, it tips downwardly to permit the collected silt to fall to the bottom of the float chamber. Immediately the silt-arresting plate commences to tip, it is arranged to trigger off operation of control means which will commence the removal of water from the buoyancy chamber of the gate valve and thereby permit it to rise and open the clean water take-off passage through which the silt will then be flushed. The silt-arresting plate returns automatically to its operative position. The control means may be arranged to operate on a time basis so that after a predetermined lapse of time, it causes the buoyancy chamber to be refilled with water to cause the gate valve to sink and close the clean water take-off passage.

According to an alternative arrangement, the silt arresting plate is not connected to the control apparatus referred to. Instead, downward rotational movement of the silt arresting plate due to silt accumulation thereon, will be arranged to cause a separate scour gate (which may be located some distance downstream) to open.

According to another modification, the float attached to the free end of the silt arresting plate may be made as a variable buoyancy float and connected to control means for admitting water to and removing it from the buoyancy chamber thereof as previously referred to. Such control apparatus may be arranged to operate the variable buoyancy float intermittently at predetermined time intervals and in timed relationship to the opening and closing movements of the gate valve.

To enable the invention to be more clearly understood, reference is now made to the accompanying drawings in which.

Figure 1:
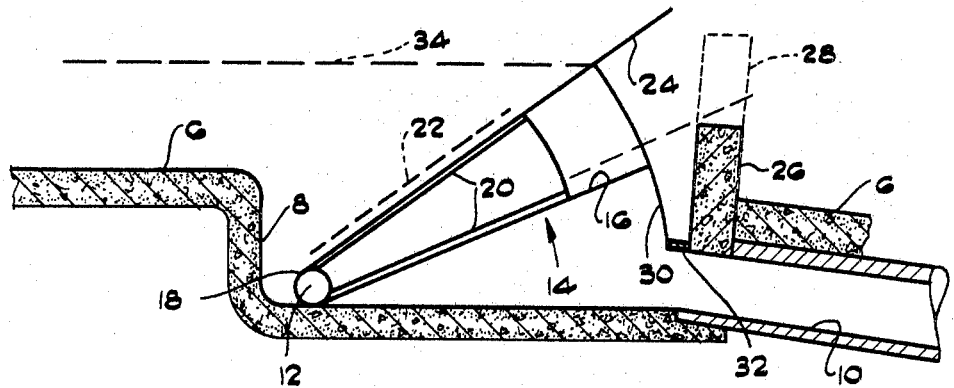
FIGURE 1 is a diagrammatic sectional side view of one example of self-clearing screening apparatus constructed according to the invention and shown with the gate valve in its open position.

Referring to FIGURE 1 of the drawings reference 6 denotes the floor of a spillway channel in which the open-topped float chamber 8 is provided and with the downstream side of which, the clean water take-off passage 10 communicates. As shown, the passage 10 may be a pipe line or lines.

Pivotally mounted for rising and falling movements about a pivot axis 12 located adjacent to the upstream side of the float chamber 8, and adjacent the floor thereof, is the sector shaped gate valve 14 which is of the variable buoyancy type by reason of the buoyancy chamber 16 at its free curved end, which chamber is arranged to be connected to control means (not shown) through a tubular pivot shaft 18. The buoyancy chamber 16 is connected to the tubular pivot shaft 18 by radial arms 20, the upper ones of which support a screen 22 permitting screened water only to flow into the float chamber 8. The top outer end region of the gate valve is constituted by a solid plate 24 which, in the closed position of the gate valve 14, rests on the spillway crest wall 26 as shown in the dotted outline, the top of which crest wall 26 is lower than the top of a parapet wall 28, so as to provide the required overflow gap therein. The lower side of the free end of the gate valve is provided with a curved sealing leaf 30 which co-operates with a fixed sealing strip 32 for purposes of closing the take-off passage 10, when it is in its "down" position.

The reference 34 denotes the normal level of the water flowing along the spillway channel 6 when the passage 10 is open. With the gate valve 14 in the open position shown, floating debris tends to bank up against the solid plate 24 above the screen 22. However, much of the debris is likely to be semi-waterlogged and in time, due to the piling up of debris, will be forced downwardly on to the screen tending to choke it. The extra pressure on the gate valve caused by this accumulation of debris, will in time tend to force the gate valve downwardly against the buoyant action of its variable buoyancy float and allow water to enter it by way of an inlet aperture (not shown) provided in the side thereof in a predetermined position, whereby the gate valve will fill and sink and close the passage 10. The debris will now be free to be washed off the top side of the gate valve and down the spillway extending beyond the spillway crest wall 26. The angle of the gate valve 14 will be arranged so that clearing of the screen 22 and the top side thereof will, with the above described circumstances, take place.

If considered necessary the level of the tubular pivot 18 may be made vertically adjustable, to vary the angle of inclination of the gate valve 14. To withdraw water from the buoyancy chamber, control apparatus of the kind previously referred to is employed. It may be arranged to operate on a timed basis so that after the lapse of a predetermined time period after the gate valve has closed, it will come into operation to remove water from the buoyancy chamber so as to allow the gate valve to rise to its original open and screening position.

Figure 2:
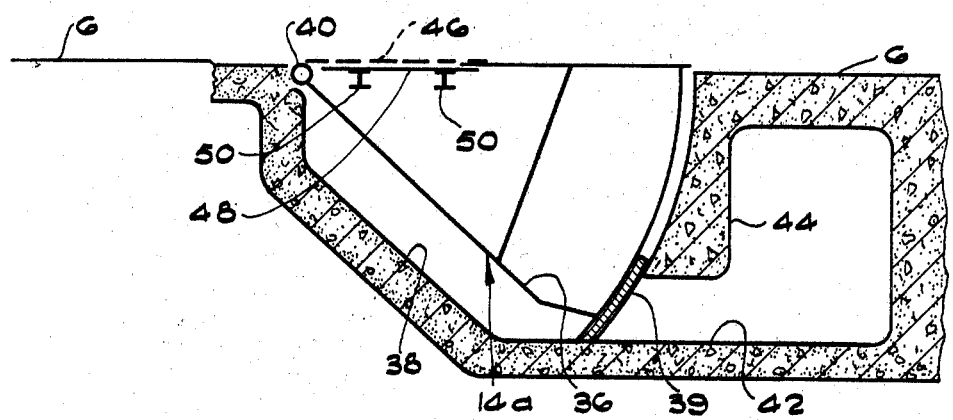
FIGURE 2 is a view similar to that of FIGURE 1, showing a modified form of apparatus for carrying out the invention, and with the gate valve shown in its closed position.

Reference is now made to FIGURE 2 of the drawings. In this case the sector shaped gate valve 14a having a buoyancy chamber 36 is mounted for pivoting movement into and out of the float chamber 38 by tubular pivot member 40 located just below the top open side of the upstream end of the float chamber 38. The lower side of the free end of the gate valve 14a is provided with a sealing leaf 39 which forms a closure for the clean water take-off passage 42 leading to a leading-off conduit 44. The region of the top surface of the gate valve 14a adjacent to the tubular pivot member constitutes an aperture covered by a screen 46. For purposes of closing the screen aperture when the gate valve is in its closed position, and thereby to lessen the tendency for silt to pile up in the float chamber 38 and thereby immobilize the gate valve 14a, a closure plate 48 is supported on fixed cross bearers 50 so that it forms a stationary closure for the screen aperture, for closing the aperture when the screen is in the "down" position, as shown. When the screen moves up, it moves away from the stationary closure 48, and the screen aperture is then open. Operation of the gate valve 14a may be effected, by connecting its buoyancy chamber to control apparatus of the kind previously referred to.

Figure 3:
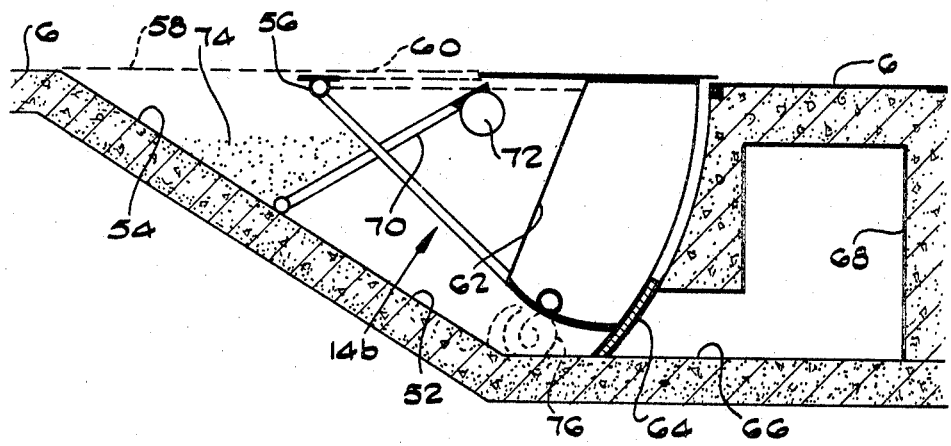
FIGURE 3 is a view similar to that of FIGURE 1 showing a further modified form which the apparatus of the invention may take and showing the gate valve in its closed position.
Figure 4:
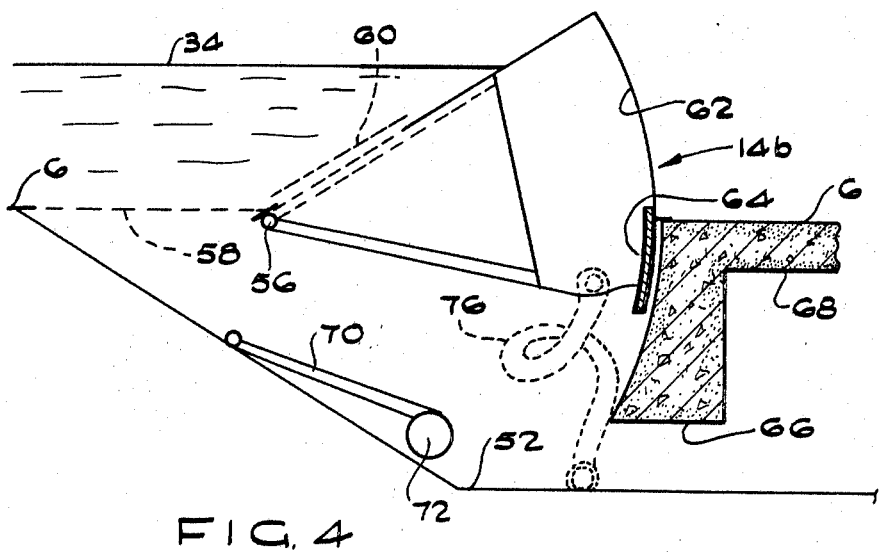
FIGURE 4 is a view similar to that of FIGURE 3, but showing the gate valve in its open position.

Reference is now made to FIGURES 3 and 4. In this modification, silt trapping means are included with the screening means.

In this case the float chamber 52 has its upstream end extended to provide a silt collecting chamber 54. A sector gate valve 14b is pivotally mounted by means of a pivot shaft 56 which is suitably supported some distance downstream from the upstream end of the float chamber 52 to leave a gap which is covered by a fixed screen 58. As in FIGURES 1 and 2, an aperture adjacent to the pivot shaft 56 is covered by a screen 60. The gate valve 14b is provided with a buoyancy chamber 62 and a sealing leaf 64 which forms a closure for the take-off passage 66 connecting with a leading-off conduit 68.

Silt is collected by means of a pivotally mounted silt arresting plate 70 which has a float 72 attached to its free side so that normally it is held in an inclined position as shown in FIGURE 3, so as to form with the upstream wall of the slit collecting chamber 52 and side walls thereof, a substantially hopper-shaped depression in which the silt 74 collects. When sufficient silt collects it weight causes the silt arresting plate 70 to pivot downwardly against the action of the float 72 to the position shown in FIGURE 4 which allows the silt to slide off the free end thereof on to the bottom of the float chamber 52. At this stage arrangements must be made to cause removal of water periodically from the buoyancy chamber 62 to permit the sector shaped gate valve 14b to rise and open the take-off passage 68. The silt is then flushed out to waste by the downward rush of water through the screens 58 and 60. The control apparatus previously referred to, may be connected to the buoyancy chamber 62 by a length of flexible tubing 76 which is coupled to a pipe (not shown) passing through a concrete end wall of the float chamber 52.

I claim:

1. A self-clearing screen apparatus for use in irrigation and like projects which comprises a spillway leading water impounded by a weir to the downstream side of it, a trough-like float chamber provided in the bottom of the spillway and having at least one clean water take-off passage communicating with it, a pivotally mounted undershot hollow variable buoyancy gate valve located in the float chamber and forming a partial closure for its top side and with a pivotally mounted end of it facing upstream so that its opposite downstream facing free end is arranged to form obturating means for the said clean water take-off passage, a screening element forming at least part of the top side of the gate valve, and means connected to the gate valve adapted to admit or remove water from it for controlling its buoyancy and thereby controlling the opening and closing of the clean water take-off passage.

2. A self-clearing screening apparatus as claimed in claim 1, wherein when the gate valve is opened, its top side, including the screen covered part of it, is arranged to assume an upstream inclined disposition so that floating debris will tend to pile up and eventually wholly or partially block the screen, which condition will cause a force to be exerted on the gate valve tending to cause it to sink and thereby close sufficiently to permit the flow of water down the spillway to wash the debris off the screen, thus lightening the gate valve and permitting its return to the fully open position.

3. A self-clearing screening apparatus as claimed in claim 2, wherein the buoyancy chamber of the gate valve is provided with a water inlet in a predetermined position so that when the floating level of the gate valve is lowered to a certain extent by the pressure caused by piled-up debris on it, water will enter such inlet and flood the buoyancy chamber thereby causing the gate valve to close completely and thus allow the debris to be washed off the screen and its top side.

4. A self-clearing screening apparatus as claimed in claim 1, wherein the gate valve is of the sector type and is so arranged in the float chamber that the lower side of its free end is constructed to form the obturating means for the clean water take-off passage, which is arranged to communicate with the float chamber at or close to its bottom side, so that silt can be readily discharged through such clean water take-off passage.

5. A self-clearing screening apparatus as claimed in claim 4, wherein the area of the top side of the gate valve covered by the screen, is an area adjacent to the upstream facing pivotally mounted end thereof and is supported by arms or a framework forming part of the gate valve.

6. A self-clearing screening apparatus as claimed in claim 5, wherein means are provided to close off the screen when the gate valve is in its fully closed position whereby the tendency for silt to build up in the float chamber is counteracted.

7. A self-clearing screening apparatus as claimed in claim 1, wherein the upstream side of the float chamber is extended in an upstream direction beyond the pivot axis of the gate valve, to provide a silt collecting chamber and the top open side of this extension is covered by a fixed screen, and wherein the bottom downstream side of the silt collecting chamber is formed by a silt arresting plate pivotally attached to the upstream side of the silt collecting chamber along a line downwardly from its top end and having float means attached to its free end so that normaly it will assume an inclined position wtih its free end raised, so as to form with the upstream side walls of the extension of the float chamber, a hopper-like depression for silt collecting purposes, the arrangement being such that when a sufficient quantity of silt has been deposited against the silt-arresting plate to overcome the buoyant effect of the float attached to its free end, it tips downwardly to permit the collected silt to fall to the bottom of the float chamber for flushing out periodically to waste via the clean water take-off passage.

8. A self-clearing screening apparatus as claimed in claim 7, wherein when the silt arresting plate commences to tip, means are provided for the removal of water from the buoyancy chamber of the gate valve and thereby permit it to rise and open the clean water take-off passage, through which the silt will then be flushed, whereafter the silt-arresting plate returns automatically to its operative position.

References Cited
UNITED STATES PATENTS

| | | | |
|---|---|---|---|
| 1,586,753 | 6/1926 | Leonard | 210—154 |
| 1,999,637 | 4/1935 | Pettepher | 210—156 |
| 2,936,074 | 5/1960 | Forshee | 210—156 |

REUBEN FRIEDMAN, Primary Examiner

T. A. GRANGER, Assistant Examiner